United States Patent
Schubert et al.

[11] Patent Number: 6,070,315
[45] Date of Patent: Jun. 6, 2000

[54] METHOD OF PRODUCING A MICROSPECTROMETER REFLECTION GRATING

[75] Inventors: Klaus Schubert, Karlsruhe; Lothar Bohn, Hambrücken, both of Germany

[73] Assignee: Forschungszentrum Karlsruhe GmbH, Karlsruhe, Germany

[21] Appl. No.: 09/106,158

[22] Filed: Jun. 29, 1998

Related U.S. Application Data

[63] Continuation-in-part of application No. PCT/EP96/05563, Dec. 12, 1996.

[30] Foreign Application Priority Data

Dec. 20, 1996 [DE] Germany ............ 196 02 079

[51] Int. Cl.[7] ............................................. B23P 17/00
[52] U.S. Cl. ..................................................... 29/417
[58] Field of Search ................................. 29/417, 33 B, 29/527.2, 458, 460; 82/1.11, 168, 11; 493/175; 427/156, 178, 404, 405, 355, 360; 324/318

[56] References Cited

U.S. PATENT DOCUMENTS 5,152,060  10/1992  Schubert et al. ................ 29/890.039

OTHER PUBLICATIONS

M.C.Huber et al., "Toroidal Grating Obtained On An Elastic Substrate", *Applied Optics*, Jun. 15, 1981, Bd. 20, Nr. 12, pp. 2139–2142.

H.W. Yen et al.,"Planar Rowland Spectrometer For Fiber–Optic Wavelength Demultiplexing", *Optics Letters*, Dec. 1981, BD. 6, Nr. 12, pp. 639–641.

Roux et al., "Fine Gratings Extend Spectrograph Resolution", *Laser Focus World*, Nr. 5, May 30, 1994, pp. 45–46.

*Primary Examiner*—S. Thomas Hughes
*Assistant Examiner*—Marc W. Butler
*Attorney, Agent, or Firm*—Klaus T. Bach

[57] ABSTRACT

In a method of producing a self-focusing reflection grating structure for the series manufacture of microspectrometers including flexible foil strips provided with a grating structure and supported in a microspectrometer housing, a foil is first mounted onto a support member of an ultraprecision turning lathe on which circumferential parallel grooves are cut into the foil by microforming diamonds providing a saw-tooth pattern of annular teeth with predetermined tooth spacing, the foil is then cut into a plurality of foil strips and the strips are bent into a curved shape providing a focusing reflection grating structure.

5 Claims, 2 Drawing Sheets

6,070,315

METHOD OF PRODUCING A MICROSPECTROMETER REFLECTION GRATING

This is a continuation-in-part application of international application PCT/EP96/05563 filed Dec. 12, 1996 and claiming priority of German application 196 02 079.4 filed Dec. 20, 1996.

BACKGROUND OF THE INVENTION

The invention resides in a method of producing a self-focusing reflection grating for a microspectrometer comprising flexible foil strips, which carry the grating structure and which are joined by support structures of a microspectrometer housing.

In SPIE, Vol. 503, Application, Theory and Fabrication of Periodic structures (1984), pages 23 and 24, a configuration including a concave grating is described and shown wherein a silicon wafer having a reflection grating is clamped, cylindrically bent, onto the front side of a flat multimode wave guide (see FIG. 3, page 24). A similar arrangement is known from FIG. 1b of JP-OS-90311 of May 21, 1985. OPTICS LETTERS, Vol. 6, No. 12, December 1981, pages 639–641 discloses a planar Rowland spectrometer with a flexible reflection grating which was produced on a thin glass substrate by way of holography and ion etching. This flexible grating is mounted in a tentering frame and pressed against the curved front side of the wave guide of the spectrometer (see FIG. 3 on page 640). Whereas in the manufacture of the wave guide, the curved front faces of thirty structures are concurrently polished (see page 639, left columns, bottom), the flexible reflection gratings must be individually produced.

Based on this state-of-the-art, it is the object of the present invention to provide also for the manufacture of the reflection gratings a method which is suitable for a mass production of the reflection gratings wherein their radius of curvature, their width and their height is selectable within wide limits.

SUMMARY OF THE INVENTION

In a method of producing a self-focusing reflection grating structure for the series manufacture of microspectrometers including flexible foil strips provided with a grating structure and supported in a microspectrometer housing, a foil is first mounted onto a support member of an ultraprecision turning lathe on which circumferential parallel grooves are cut into the foil by microforming diamonds providing a saw-tooth pattern of annular teeth with predetermined tooth spacing, the foil is then cut into a plurality of foil strips and the strips are bent into a curved shape providing a focusing reflection grating structure.

With the method according to the invention, the gratings for several hundred foil strips can be made in a single manufacturing procedure while maintaining highest quality standards. The width and the height of the reflection grating structures can be freely selected within wide limits. A lathe suitable for the manufacture as well as shape cutting diamonds with which the finest structures in a $\mu$m range can be cut into the foil is referred to in DE 37 09 278 C2.

An embodiment of the invention will be described in greater detail on the basis of the accompanying drawings.

DESCRIPTION OF A PREFERRED EMBODIMENT

Figure 1:
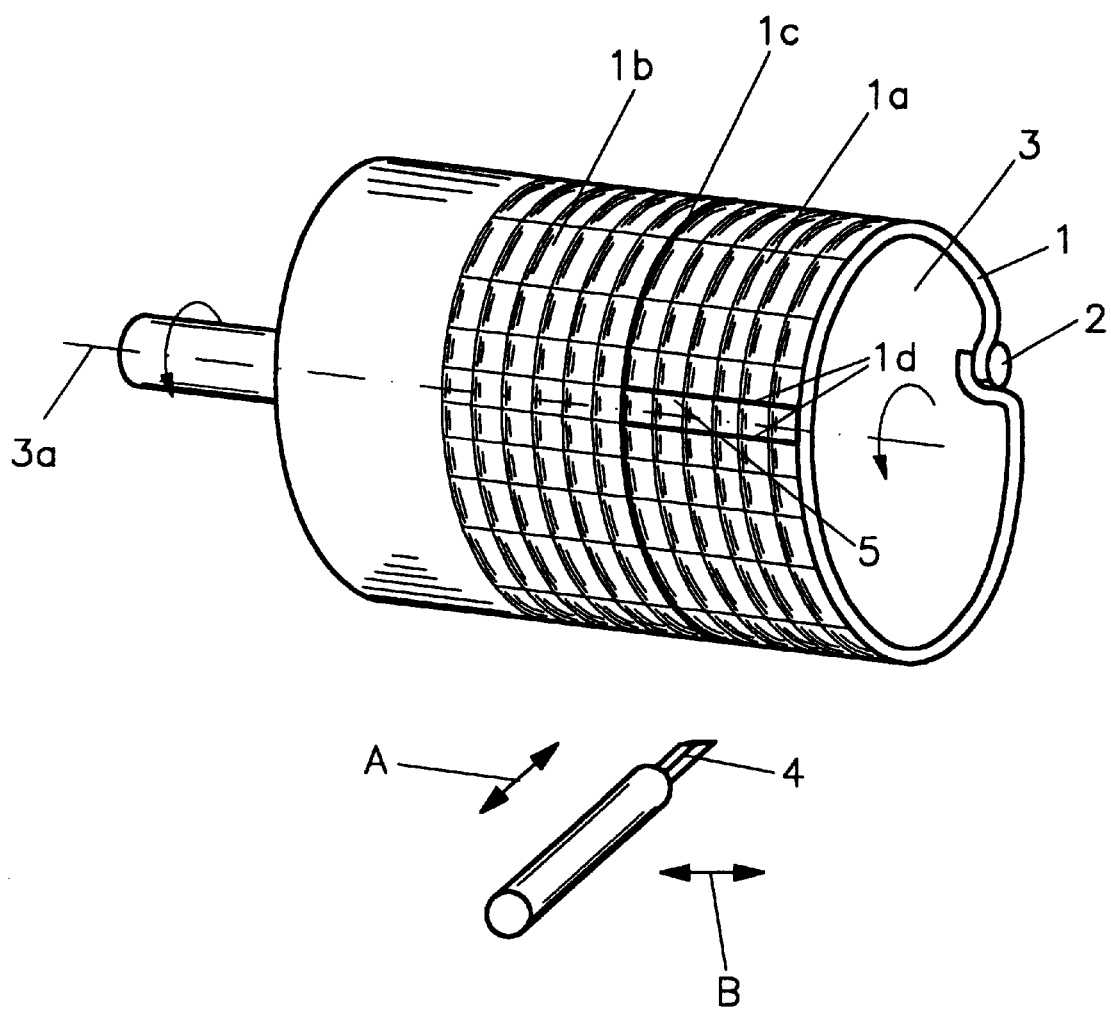
FIG. 1 shows schematically a support drum of an ultra precision lathe on which a foil is mounted.

FIG. 1 shows a thin foil 1 of metal or plastic material, for example, a 100 $\mu$m thin copper foil, which, by way of a recessed clamping element 2, is mounted onto a support member 3 of an ultraprecision turning lathe. The support member 3 is rotated and two series 1a and 1b of parallel grating teeth 5a with predetermined spacing are cut into the foil 1 by a micro-shaping diamond which is movable in the directions "A" and "B". The distance between adjacent teeth is for example 10 $\mu$m, and the tooth height is for example 1.6 $\mu$m. In this way, a tooth grating structure of predetermined width and depth is formed. By a peripheral separation cut 1c, the series 1a, 1b are separated from each other. By cuts 1d extending parallel to the lathe axis, the structured foil 1 is cut into a multitude of foil strips 5. The separating cuts 1c determine the width, the distance of the cuts 1d, the height of the foil strips 5 and consequently the height H of the reflection grating with the grating teeth.

Figure 2A:
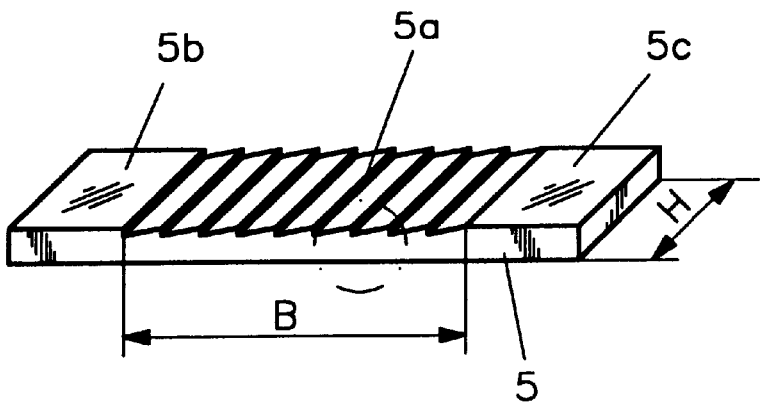
FIG. 2a shows a foil strip provided with a grating structure.
Figure 2B:
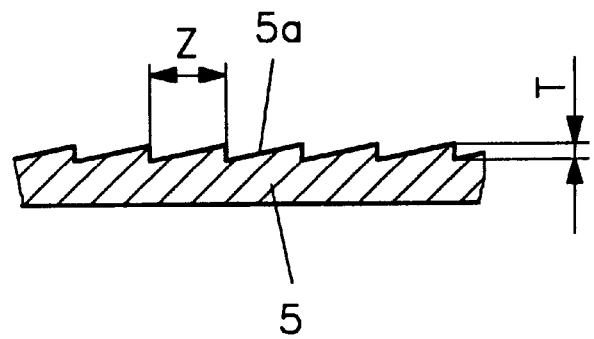
FIG. 2b shows in an enlarged view the cross-section of the grating structure of FIG. 2a, and FIG. 3 shows two housing parts of a microspectrometer with a grating foil mounted therebetween.

FIG. 2 shows such a foil strip 5 with the height H and with an average area of the width B, which includes the parallel grating teeth cut into the strip 5. There are two opposite end areas 5b, 5c adjacent the structured center area which end areas are not structured. FIG. 2a shows, in a highly enlarged representation, the sawtooth-like grating structure 5a. The tooth width Z (grating constant) and tooth depth T may be different depending on the intended use. If foil materials with relatively low reflection properties, particularly plastic foils, are used, the structured surfaces need to be coated with a reflective metal such as gold, by sputtering or vapor deposition.

Figure 3:
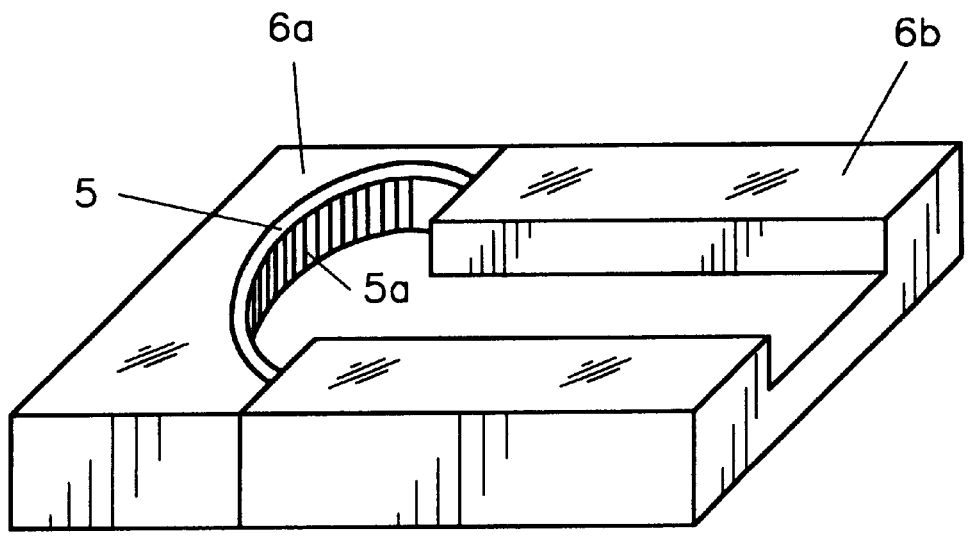

FIG. 3 shows two housing parts 6a, 6b of a planar Rowland spectrometer for example for 1R radiation. Between the two housing parts 6a, 6b, the foil strip 5 including the reflection grating structure 5a of FIG. 2a is firmly engaged. The concave curvature of the housing part 6a in which the foil strip 5 is received and supported by its smooth rear surface corresponds to the basic grating circle while the ends of the light wave guide which serve for the in-coupling and out-coupling of the IR light are arranged opposite each other on the Rowland circle (in this regard, see FZK-Bericht 5609 of the Forschungszentrum Karlsruhe, GmbH. June 1995, pages 14 and 15). Before the foil 1 is mounted onto the support member 3, a thin metal layer of, for example, copper, silver or gold may be galvanically depositing on the foil 1 or a layer of nickel, for example, may be chemically deposited. The surface of this thin metal layer is then firmly ground. After mounting of the foil 1 onto the support member 3 of the turning lathe, the grating teeth are cut into the surface of the thin metal layer. Then the cuts 1c and 1d are made to provide the foil strips as described earlier.

Instead of mounting a prefinished foil onto the support member 3, it is also possible to deposit on a rotatable carrier member of the turning lathe galvanically a metal layer of, for example, copper, silver or gold or chemically a layer of for example, nickel which is fine-ground before teeth are cut into it. After structuring the layer with grating teeth and cutting the layer to divide it into foil strips provided with reflection grating structures, the foil strips are separated from the carrier member. The carrier member may be provided first with a sacrificial layer, which can be selectively etched away. The sacrificial layer may also be galvanically deposited.

With the methods described, grating foil strips which have high metallic purity, high surface quality and are essentially free of tensions can be made.

Alternatively, to this method, mounted spectrometers can be reproduced by molding.

For this purpose, the spectrometer with the self-focusing reflection gratings are galvanically formed whereby a negative form of the spectrometer is generated. With this negative form, which is used as a molding tool, positive forms of the spectrometer can be made in a well-known manner.

What is claimed is:

1. A method of producing a focusing reflection grating structure for the series manufacture of microspectrometers including flexible foil strips provided with a grating structure which foil strips are supported by housing portions of said microspectrometers, said method comprising the steps of:

depositing a thin layer of a reflective metal on a foil, mounting said foil with said reflective metal layer on onto a support member of an ultra precision turning lathe, rotating said support member and cutting, with microforming diamonds, circumferential parallel grooves into said reflective metal layer on said foil such that sawtooth-like annular teeth with predetermined tooth spacing and depth are generated, then dividing the foil by cuts extending parallel to the turning lathe axis into a plurality of narrow flexible strips, whereby the distance between said cuts determines the height of said foil strips, and bending the flexible foil strips into a curved shape providing a focusing reflection grating structure.

2. A method according to claim 1, wherein said metal layer consists of one of copper, silver and gold and is galvanically deposited, and said metal layer is polished before said teeth are cut into said metal layer.

3. A method according to claim 1, wherein at least two series of sawtooth-like annular teeth are cut into said foil which are then separated by a peripheral dividing cut.

4. A method according to claim 1, wherein said focusing reflection grating structure is mounted into a housing which includes a passage for incoming light and a passage for reflected light.

5. A method according to claim 4, wherein said housing with the focusing reflection grating is galvanically formed, whereby a negative copy is made and wherein from said negative form a self-focusing spectrometer is formed.

* * * * *